United States Patent [19]  
Himes

[11] Patent Number: 4,520,138  
[45] Date of Patent: May 28, 1985

[54] DULL, SMOOTH UNIT SOLES

[75] Inventor: Glenn R. Himes, Houston, Tex.

[73] Assignee: Shell Oil Company, Houston, Tex.

[21] Appl. No.: 603,022

[22] Filed: Apr. 23, 1984

[51] Int. Cl.$^3$ ................................................ C08J 9/12
[52] U.S. Cl. ........................................ 521/91; 521/95; 521/98; 521/139; 521/140; 523/218; 523/219; 525/99; 525/DIG. 914
[58] Field of Search ................ 525/99, 914; 521/98, 521/140, 91, 95, 139; 523/218, 219

[56] References Cited

U.S. PATENT DOCUMENTS

| | | | |
|---|---|---|---|
| 3,733,284 | 5/1973 | Shiratsuchi et al. | 525/914 |
| 4,306,034 | 12/1981 | Thorsud | 521/140 |
| 4,310,582 | 1/1982 | Stumpe, Jr. | 521/140 |
| 4,407,979 | 10/1983 | De Guilio | 521/140 |
| 4,423,160 | 12/1983 | De Guilio | 521/140 |

*Primary Examiner*—Morton Foelak  
*Attorney, Agent, or Firm*—Peter A. Bielinski

[57] ABSTRACT

Unit soles having a smooth, dull appearance are molded from a polymeric composition comprising a radial (AB-)—$_x$BA monoalkenyl arene/conjugated diene block copolymers, syndiotactic-1,2-polybutadiene a polystyrene resin, a hydrocarbon extending oil, a blowing agent and a filler.

14 Claims, No Drawings

DULL, SMOOTH UNIT SOLES

BACKGROUND OF THE INVENTION

1. Field of the Invention

The invention relates to a polymeric composition having a smooth, dull appearance in molded unit soles. More particularly, the invention relates to a polymeric composition containing radial monoalkenyl arene-conjugated diene block copolymers, syndiotactic-1,2-polybutadiene, a polystyrene resin, a hydrocarbon extending oil, a blowing agent and a filler.

2. Description of the Prior Art

The use of certain block copolymers and their compounds in a number of end-uses and especially footwear, is rapidly expanding. For example, in the footwear industry, certain block copolymer compounds are being used in large volume in the manufacture of a wide variety of shoes including canvas shoes, sport shoes, and dress shoes. The block copolymers may be utilized for this purpose for soling, foxing, innersoles and the like. These compositions are disclosed in Hendricks et al., U.S. Pat. No. Re. 28,236. In general, these shoe component compositions usually comprise a mixture of styrene-butadiene block copolymer, extending oil, polystyrene and possibly a filler.

For the most part, these block copolymer compositions have proven to be particularly advantageous in many respects, including flexibility, processability, lack of vulcanization requirement and wet slip. However, in certain respects, shortcomings have been noted. For example, commercial compounds should be free from delamination, free from elephant hide, and free from flow markings and marring. With respect to many styles in the casual and dress shoe areas of footwear, one of the major shortcomings of the block copolymer compounds such as those referred to in U.S. Pat. No. Re. 28,236 is the lack of a smooth appearance. Present block copolymer compounds lack the smooth, relatively unblemished surface which is characteristic of vulcanized rubber, injection molded poly(vinyl chloride) or leather. Especially desired is a rubberlike dull surface combined with unblemished smoothness.

One attempt to achieve a smooth look appearance is taught in U.S. Pat. No. 4,216,132. In the '132 patent, a mixture of linear and radial block copolymers and high density polyethylene are disclosed. While this polymeric composition resulted in relatively smooth appearance for unit soles, the surface was too shiny for certain shoe styles. Instead, what is required is a polymeric composition which results in unit soles having smooth, non-splayed, dull surface.

Another U.S. Pat. No. 4,377,655 described a mixture of linear and radial block copolymers and a styrene-acrylonitrile copolymer.

SUMMARY OF THE INVENTION

The present invention deals with a polymeric composition which has particular utility in the injection molding of unit soles having a smooth, dull appearance. Specifically, the present invention is a polymeric composition comprising:

(a) 100 parts by weight of one or more radial (AB-)$_x$BA block copolymers where x is greater than 1, each block A being a monoalkenyl arene polymer having an average molecular weight between about 5,000 and 7,5000, each block B being an elastomeric conjugated diene polymer having an average molecular weight between about 15,000 and about 300,000, and said blocks A comprise 8-90% by weight of each copolymer;

(b) about 5 to about 100 parts by weight of a syndiotactic 1,2-polybutadiene;

(c) about 5 to 100 parts by weight of polystyrene;

(d) about 0 to about 200 parts by weight of a hydrocarbon rubber extending oil;

(e) about 0 to about 250 parts by weight of a large particle porous filler; and (f) about 0.01 to about 10 parts by weight of a blowing agent It has been found that a combination of styrene-butadiene block copolymer, syndiotactic-1,2-polybutadiene, a blowing agent, silica and polystyrene resin yields an injection moldable composition which gives a dull, smooth look in unit soles which has been long sought after in the footwear industry. The appearance is at least as attractive as vulcanized rubber (e.g., natural rubber or styrenebutadiene rubber) but this composition is more cheaply processed and completely recyclable.

Dullness results from 1,2 polybutadiene, which is partially crystalline and incompatible with the styrene-butadiene-styrene; the large particle porous structure silica which, although moisture-bearing and hygroscopic, does not splay the surface of this composition as more conventional silicas do during injection molding; and the blowing agent. The level of each ingredient is important in achieving the desired appearance and good physical properties.

Prior art concepts employed polystyrene, poly(α-methylstyrene), high impact polystyrene (rubber-modified polystyrene) and the like to harden and stiffen Thermoplastic Rubber compounds. However, these resins imparted an undesirable shiny surface to injection molded unit soles. Polypropylenes have also been evaluated in compositions of this type. Although generally dull in appearance, such combinations usually exhibit delamination (easy separation of a surface layer) after injection molding of a unit sole.

Prior art compunds generally relied on hydrated silica filler to impart dullness to Thermoplastic Rubber compounds. This type of dullness is inferior to that given by the subject invention because the surface is relatively rough, grainy and uneven in texture. The surface generated by hydrated silica is due to steam evolved at injection molding temperatures. The subject invention does not rely on evolution of a volatile component for surface dullness. The preferred filler, a porous large particle silica, does not evolve steam at Thermoplastic Rubber injection molding temperatures (300°–380° F.). Other non-steam generating fillers, including calcium carbonates, talcs, clays, some silicates, etc., are acceptable, however, porous large size particles give the best results.

Detailed Description of the Invention

The block copolymer component of the present invention is a radial (A—B—)$_x$B—A block copolymer where x is greater than 1. Preferably, x varies from 1 to 15, more preferably from about 2 to about 6. The A blocks are monoalkenyl arene polymer blocks and the B blocks are elastomeric conjugated diene polymer blocks. Typical linear block copolymers have the structure polystyrene-polybutadiene-polystyrene. A typical radial polymer would comprise one in which the diene block has three or more branches, the tip of each branch being connected to a polystyrene block. See U.S. Pat. No. 3,594,452. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene.

The average molecular weights of each of the blocks may be varied as desired. The monoalkenyl arene polymer blocks preferably have number average molecular weights between about 5,000 and about 75,000, more preferably between about 8,000 and about 30,000. The elastomeric conjugated diene polyme blocks preferably have number average molecular weights between about 15,000 and about 300,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monalkenyl arene blocks in the finished block polymer should be between about 8% and 90%, preferably between about 20% and about 50% by weight. The general type and preparation of these block copolymers are described in U.S. Pat. No. Re. 28,246 and in many other U.S. and foreign patents.

The syndiotactic 1,2-polybutadiene can be present in amounts from 5 to 100 phr and preferably 20-60 phr, and is important in the dulling effect. The dulling effect is believed to result from the scattering of reflected light by the myriad of surfaces in the filler particles and the multiple interfaces around the incompatible 1,2-polybutadiene particles.

The polystyrene can be anionic polystyrene or α-methylstyrene resin. The number average mol. wt. should be 5,000 to 100,000, preferably 5,000 to 40,000.

Any suitable blowing agent may be used and these are well known in the art. The preferred blowing agent in the present invention is azodicarbonamide or azobisformamide which is available commercially as Celogen AZ130. The blowing agent is present to prevent sinks and add a slight amount of dulling. Molded shoe soles exhibit a slight amount of internal foaming in thick sections. The blowing agent may be present at any useful amount preferably at from 0.01 to 10 phr more preferably from 0.1 to 1.0 phr. Phr refers to parts by weight per hundred parts by weight rubber as block copolymer, in this case.

The hydrocarbon rubber extending oils, usually referred to as paraffinic/naphthenic oils, are usually fractions of refined petroleum products having less than about 30% by weight of aromatics (by clay-gel analysis) and usually have viscosities between about 100 and 500 SSU at 100° F. Commercial extending oils include SHELLFLEX ® oils, Nos. 310, 371 and 311 (which is a blend of 310 and 371). The amount of extending oil employed varies from about 0-200 phr, preferably from about 50-150 phr.

The fillers which may be used in the present compositions are well known in the art and include clay, talc, alumina, anhydrous silica, titanium dioxide, and other pigments as well as certain dry fibrous fillers such as polyester or acrylic fibers. Preferred fillers include porous large particle silica or alumina. Particle size may vary, however, 1 to 25 microns is preferred. In a most preferred embodiment, the filler is aerogel or hydrogel silica. The amount of filler employed varies from 0-250 phr, preferably 5-60 phr.

Additional minor amounts of antioxidants, ultraviolet stabilizers and the like may also be added. Any stabilizers known in the art may be employed. Preferred phenolic stabilizers include tris nonylphenyl phosphite available as Polygard HR from Uniroyal or 1,3,5-trimethyl-2,3,6-tris[3,5-di-tert-butyl-4-hydroxybenzyl]-benzene available from Ethyl Corporation as AO 300.

In a preferred embodiment, the polymeric compositions also contain between about 0.1 and about 3.0, preferably between about 0.3 and about 1.0 phr stearic acid. This stearic acid is useful in imparting additional dullness to the composition.

The components of this invention may be combined by processes known in the art including blending such as by extrusion, Banbury mixing or by dry-blending procedures. In the latter case, it is preferred that the block copolymer and other polymers be formed or ground in particles having an average size less than about 4 millimeter diameter onto which the extending oil is absorbed. Following this, the remaining powdered components may be added and vigorously dry-blended therewith such as in well-known dry-blending equipment long used in the PVC dry-blending art. Preferably, however, the various components are melt blended.

While the present specification emphasizes the use of these compositions in footwear components, other end uses also are contemplated. These include, for example, automotive parts and wire cable coatings. Tubular products such as hoses and the like also are contemplated.

The use of the present compositions in footwear includes especially their use in soling when prepared by injection molding and slab soling, such as produced by cutting shoe sole forms from extruded slabstock. The advantages of the present compositions are most apparent in injection molding of unit soles which are later attached by adhesion or sewing to uppers. The compositions also may be used in the manufacture of injection molded canvas shoe soles wherein the soling is directly injection molded onto the canvas upper which may be canvas or various natural and synthetic fibers, including leather, vinyl and polymeric materials. In some cases pre-coating of the upper with a primer is required to effect adhesion.

The invention is further illustrated by means of the following illustrative embodiments, which are given for the purpose of illustration alone and are not meant to limit the invention to the particular reactants and amounts disclosed.

ILLUSTRATIVE EMBODIMENTS

In the Illustrative Embodiment, two compositions were prepared. The radial block copolymer was a styrene-butadiene block copolymer having the structure (SB—)$_x$BS where x averages about 2.5. All examples contained a standard pigment-antioxidant-inhibitor package.

The individual components were mixed on a Banbury mixer at about 350° F. for a total mix time of about 3 minutes.

Samples of the various compositions were tested according to the following tests:

| Test | Standard Test Number |
| --- | --- |
| Shore A Hardness | D-2240 |
| Tinius Olsen Stiffness | D-747 |
| Taber Abrasion | D-1044 |
| Ross Cut Growth | D-1052 |

The formulations and test results are presented below in Table I.

TABLE I

| Parts by Weight | | |
| --- | --- | --- |
| | I | II |
| Radial Block Copolymer | 100 | 100 |
| Shellflex 371 Extending Oil | 121 | 122 |
| JSR RB-830 (Syndiotactic 1,2-Polybutadiene) | 34 | 34 |
| hydrogel mfd. silica | 16 | 16 |
| alpha-methylstyrene resin | — | 40 |
| Anionic polystyrene resin | 40 | — |
| blowing agent (Celogen AZ 130) | 0.5 | 0.5 |
| Stabilizers | 1.0 | 0.35 |
| Pigment Package | 0.04 | 0.04 |
| Total PHR | 312.54 | 312.89 |

TABLE II

| Smooth Look Compound Properties | | |
| --- | --- | --- |
| | I | II |
| Melt Flow, Cond. E, g/10 min. | 17 | 28 |
| Hardness, Inj. Molded Unit Sole, Inst. Shore A | 70 | 69 |
| Tabler Abrasion, cc/kc | 0.83 | 0.72 |
| Tinius Olsen Stiffnes, psi | 1660 | 1780 |
| Adhesion, pli | 50 | 50 |
| Mode of Failure | Rubber Tearing | Rubber Tearing |
| Ross Flex Crack Resistance, kc to 500% crack growth | >3,200 | >3,200 |
| Tear Strength, parallel/normal, pli | 130/130 | 150/140 |
| Tensile strength, P/N, psi | 660/730 | 740/780 |
| Elongation, P/N, % | 630/690 | 600/680 |
| Modulus at 300%, P/N, psi | 340/330 | 350/310 |
| Set, P/N, % | 41/44 | 41/43 |

Properties of the two compounds were essentially the same except the latter exhibited higher melt flow, see Table II, and demolded with slight difficulty. Preferred approach may be decided on economics. The required smooth dullness was provided by both compounds.

What is claimed is:

1. A non-delaminating polymeric composition having a smooth, dull appearance in molded unit soles, said composition comprising:
   (a) 100 parts by weight of one or more radial (AB-)$_x$BA block copolymers where x is greater than 1, each block A being a monoalkenyl arene polymer having an average molecular weight between about 5,000 and 75,000, each block B being an elastomeric conjugated diene polymer having an average molecular weight between about 15,000 and about 300,000, and said blocks A comprise 8–90% by weight of each copolymer;
   (b) about 5 to about 100 parts by weight of a syndiotactic 1,2-polybutadiene;
   (c) about 5 to 100 parts by weight of polystyrene;
   (d) about 0 to about 200 parts by weight of a hydrocarbon rubber extending oil;
   (e) about 0 to about 250 parts by weight of a large particle porous filler; and
   (f) about 0.01 to about 10 parts by weight of a blowing agent.

2. The composition according to claim 1 wherein said A block is a polystyrene block and said B block is a polybutadiene block.

3. The composition according to claim 1 wherein said radial block copolymer has the structure (AB—)$_x$BA where x is between about 2 and about 6.

4. The composition according to claim 1 wherein the amounts of each component in the composition are:
   (a) 100 parts by weight radial block copolymer;
   (b) about 20 to 60 parts by weight of a syndiotactic 1,2-polybutadiene;
   (c) about 20 to 60 parts by weight polystyrene;
   (d) about 50 to 150 parts by weight hydrocarbon extending oil;
   (e) about 5 to about 60 parts by weight filler; and
   (f) about 0.1 to about 1.0 parts by weight of a blowing agent.

5. The composition according to claim 1 wherein the polystyrene has a molecular weight between about 5,000 and 100,000.

6. The composition according to claim 1 wherein the polystyrene has a molecular weight of between 5,000 and 40,000.

7. The composition according to claim 1 wherein the polystyrene is alpha methylstyrene.

8. The composition according to claim 1 wherein the polystyrene is anionic polystyrene.

9. The composition according to claim 1 wherein the blowing agent is azobisformamide.

10. The composition according to claim 1 wherein said filler is hydrogel manufactured silica.

11. The composition of claim 1 wherein the filler is aerogel manufactured silica.

12. The composition of claim 1 wherein the filler has a particle size from about 1 to about 25 microns.

13. The composition of claim 1 also containing stearic acid.

14. The unit sole molded from the composition of claim 1.

* * * * *